3,103,443
MULLITE PORCELAIN
Don Wilson Bissell and Cedric D. Brunner, Rockton, Ill., assignors to Ipsen Ceramics, Inc., Pecatonica, Ill., a corporation of Illinois
Filed Sept. 8, 1958, Ser. No. 759,741
3 Claims. (Cl. 106—45)

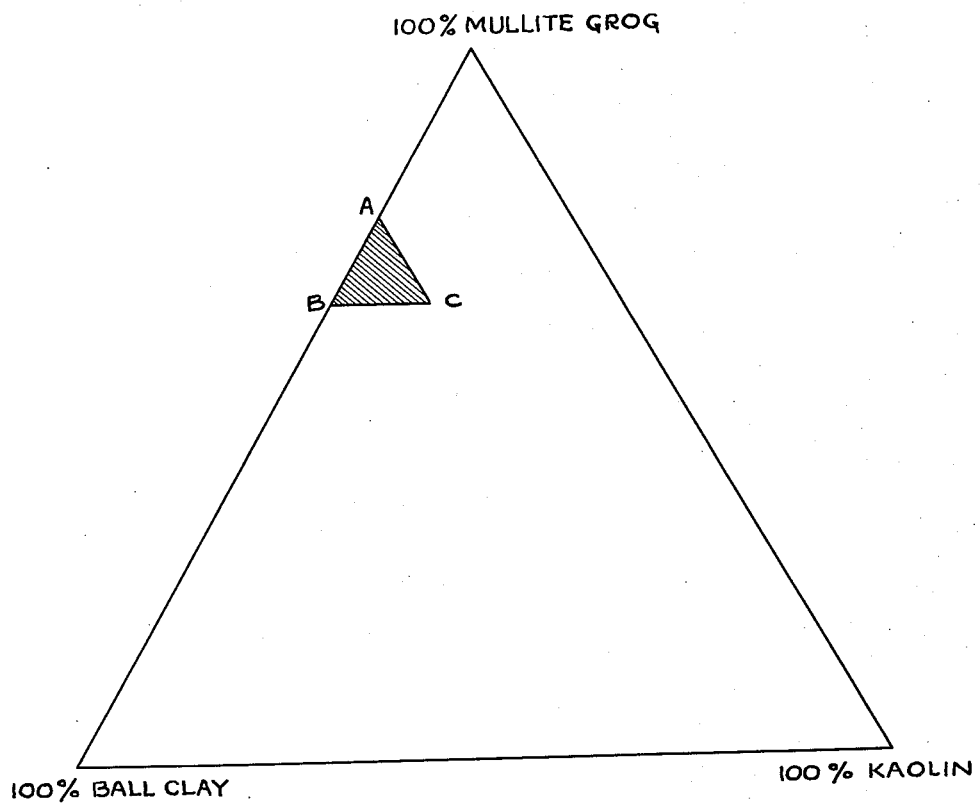
| | | |
|---|---|---|
| A | 80% | MULLITE GROG |
| | 20% | BALL CLAY |
| | 0% | KAOLIN |
| B | 70% | MULLITE GROG |
| | 30% | BALL CLAY |
| | 0% | KAOLIN |
| C | 70% | MULLITE GROG |
| | 20% | BALL CLAY |
| | 10% | KAOLIN |
INVENTORS
Don Wilson Bissell
Cedric D. Brunner
by Carlson, Pitzner, Hubbard & Wolfe
ATTORNEYS _Patented Sept. 10, 1963_

This invention relates to a mullite porcelain which may be used as a refractory material in apparatus such as heat treating equipment.

The principal object is to provide a new and improved mullite porcelain which is thermally stable and does not change in crystal composition even when subjected to high temperatures for long periods of time.

A more detailed object is to provide a composition which virtually eliminates the possibility of devitrification in service use.

Other objects and advantages of the invention will become apparent from the following detailed description taken in connection with the accompanying drawing, in which the single FIGURE is a triaxial graph illustrating the range of proportions of materials which may be used to form the mullite porcelain of the present invention.

The invention has reference to a mullite porcelain which is used as a refractory material in heating apparatus. It is particularly useful in forming protective tubes for thermocouples and the gas burner radiant tubes of a heat treating furnace. Prior porcelains of this type have had a comparatively short service life since they devitrified when subjected to high temperatures. This was the result of a portion of the silica in the porcelain changing its crystal structure and becoming cristobalite which has a relatively high coefficient of thermal expansion. As a result, the porcelain became porous and eventually fractured.

We have discovered that, by forming the porcelain from certain materials and by mixing these materials in proportions falling within a certain range, the tendency of the porcelain to form cristobalite is virtually eliminated and the service life, therefore, is many times that of prior porcelains. In general, the materials we use are a mullite grog, a ball clay and kaolin clay.

The mullite grog used contains about 95 percent crystalline mullite by volume, two percent corundum and three percent glass which grog is composed of approximately 75 percent alumina ($Al_2O_3$) and 25 percent silica ($SiO_2$). The grog may be obtained by preparing a mixture of Bayer process, low alkali alumina powder and kaolin clay and by calcining the mixture in the form of dobies to Pyrometric Cone Equivalent 35, the kaolin clay being used as a means of supplying the silica. An example of this calcination is to increase the heat 20 degrees per hour until a minimum temperature of 3245 degrees F. is reached. The heating is continued below the mullite disassociation temperature of 3326 degrees F. until the mullite development is complete. The particular proportions of alumina and kaolin clay used will depend on the alumina and silica content of the kaolin clay and may be computed in a manner well known in the art to obtain the desired composition of the grog.

As to the ball clay, the latter should contain between 28 and 31 percent alumina and between 53 and 56 percent silica. Of the silica, not more than 20 percent should be free silica and for best results, the free silica content should be held at 15 percent or less. Also, the ball clay should have a Pyrometric Cone Equivalent of between 32 and 34. Similar requirements are placed on the kaolin clay which should contain between 36 and 38 percent alumina and between 46 and 48 percent silica with not more than five percent free silica. The Pyrometric Cone Equivalent of the kaolin should be between 35 and 36.

To prepare the materials, they are mixed in proportions shown by the triaxial graph in the drawing. In this graph, the percentage of grog is measured vertically to the upper vertex so that the base of the graph is zero grog and the vertex is 100 percent grog. Similarly, the kaolin clay is measured from the left leg to the right vertex and the ball clay from the right leg to the left vertex. Thus, any point on the graph represents a specific proportioning of the three materials. We have discovered that the formation of cristobalite is strongly inhibited when using the materials described above in proportions falling within the shaded area in the graph. The formation is so minimized that less than five percent of the porcelain becomes cristobalite even after extended periods of use at high temperatures. This area of the graph, like the graph itself, is an equilateral triangle and is defined by the points A, B and C which constitute its vertices. The vertex A is the point of 80 percent grog, 20 percent ball clay and zero percent kaolin clay; the vertex B is the point of 70 percent grog, 30 percent ball clay and zero percent kaolin clay; and the vertex C is the point of 70 percent grog, 20 percent ball clay and 10 percent kaolin clay.

After obtaining the proper mixture of the materials, the mixture is used in the conventional manner. Thus, it is ground with water in a pebble mill to a fineness so that the particles will remain suspended in water. The pebble mill is provided with a high density lining and grinding media to hold contamination to a minimum. After being ground, the mixture may be cast, pressed or extruded to form the porcelain articles.

If the porcelain is to be cast, best results will be obtained if the illite content of the ball clay is low and preferably not over 10 percent. Also, in casting, a fine grind of kaolin clay should be used and the grain size should be on the order of 93 percent finer than 10 microns. As in the case of all refractory porcelain, the article which was cast, pressed or extruded is fired to a temperature sufficiently high to cause vitrification.

A mullite porcelain made in accordance with the invention has been found to have a substantially longer service life than prior porcelains and accelerated tests indicate that the porcelain will have a life of at least several years when subjected to temperatures of 2000 degrees F. while conventional porcelains become porous and develop cristobalite after about three months at these temperatures.

We claim as our invention:

1. A mullite porcelain which is fired from a mixture composed of mullite grog, ball clay and kaolin clay in which the proportion of materials is within the range defined in a triaxial graph by (1) 80 percent grog, 20 percent ball clay and 0 percent kaolin clay, (2) 70 percent grog, 30 percent ball clay and 0 percent kaolin clay and (3) 70 percent grog, 20 percent ball clay and 10 percent kaolin clay, in which the grog is approximately 95 percent crystalline mullite composed approximately of 75 percent alumina and 25 percent silica, in which the ball clay contains 28 to 31 percent alumina and 53 to 56 percent silica with less than 20 percent free silica and has a Pyrometric Cone Equivalent of 32 to 34, and in which the kaolin clay contains 36 to 38 percent alumina and 46 to 48 percent silica with less than 5 percent free silica and has a Pyrometric Cone Equivalent of 35 to 36.

2. A mullite porcelain as defined in claim 1 in which the ball clay contains less than 10 percent illite clay and in which the grain size of the kaolin clay is 93 percent finer than 10 microns.

3. A fired refractory shape formed of a mullite grog consisting substantially entirely of well-developed interlocked mullite crystals, with an alumina content of approximately 75%, and a bonding material consisting of alumina and silica, the alumina constituting from about 28% to 33% of the bonding material; the proportions of the grog and bonding material being, respectively, 75–80% and 25–20%.

References Cited in the file of this patent

UNITED STATES PATENTS

| | | |
|---|---|---|
| 1,631,730 | Jeffery et al. | June 27, 1927 |
| 2,079,715 | Pole | May 11, 1937 |
| 2,195,949 | Wood | Apr. 2, 1940 |
| 2,878,132 | Bachman et al. | Mar. 17, 1959 |

FOREIGN PATENTS

| | | |
|---|---|---|
| 6894/27 | Australia | Apr. 13, 1927 |
| 508,514 | Canada | Dec. 28, 1954 |

OTHER REFERENCES

Norton: "Refractories," 1st ed., pub. 1931 by McGraw-Hill, N.Y. (pp. 27, 29, 558).